S. T. WELLMAN.
APPARATUS FOR TREATING METALS.
APPLICATION FILED AUG. 18, 1911.
1,116,772.
Patented Nov. 10, 1914.
2 SHEETS—SHEET 1.
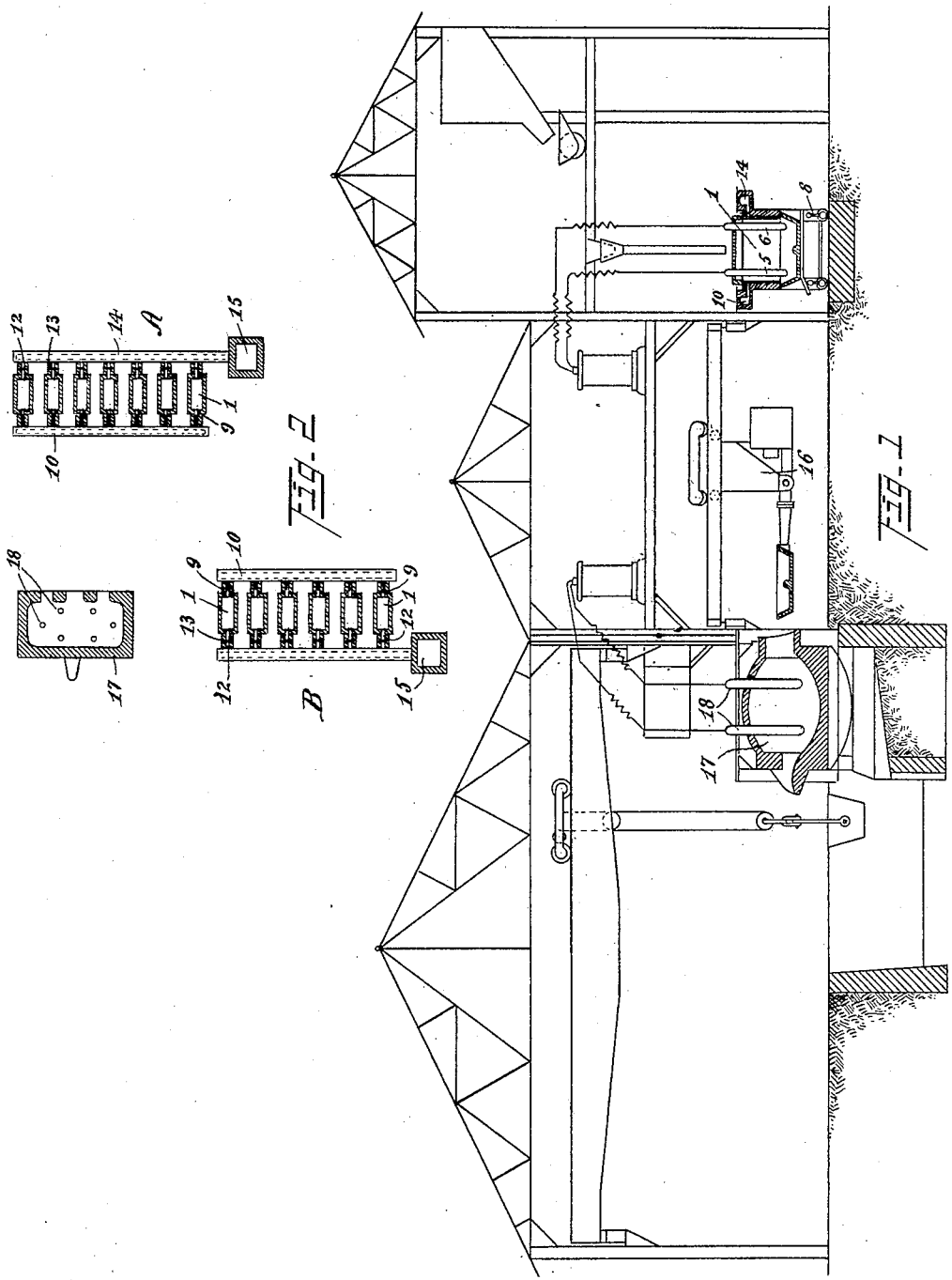
Witnesses:
E. M. Sweeney
L. Griswold
Inventor
S. T. Wellman
by Karl Fenning
Attorney

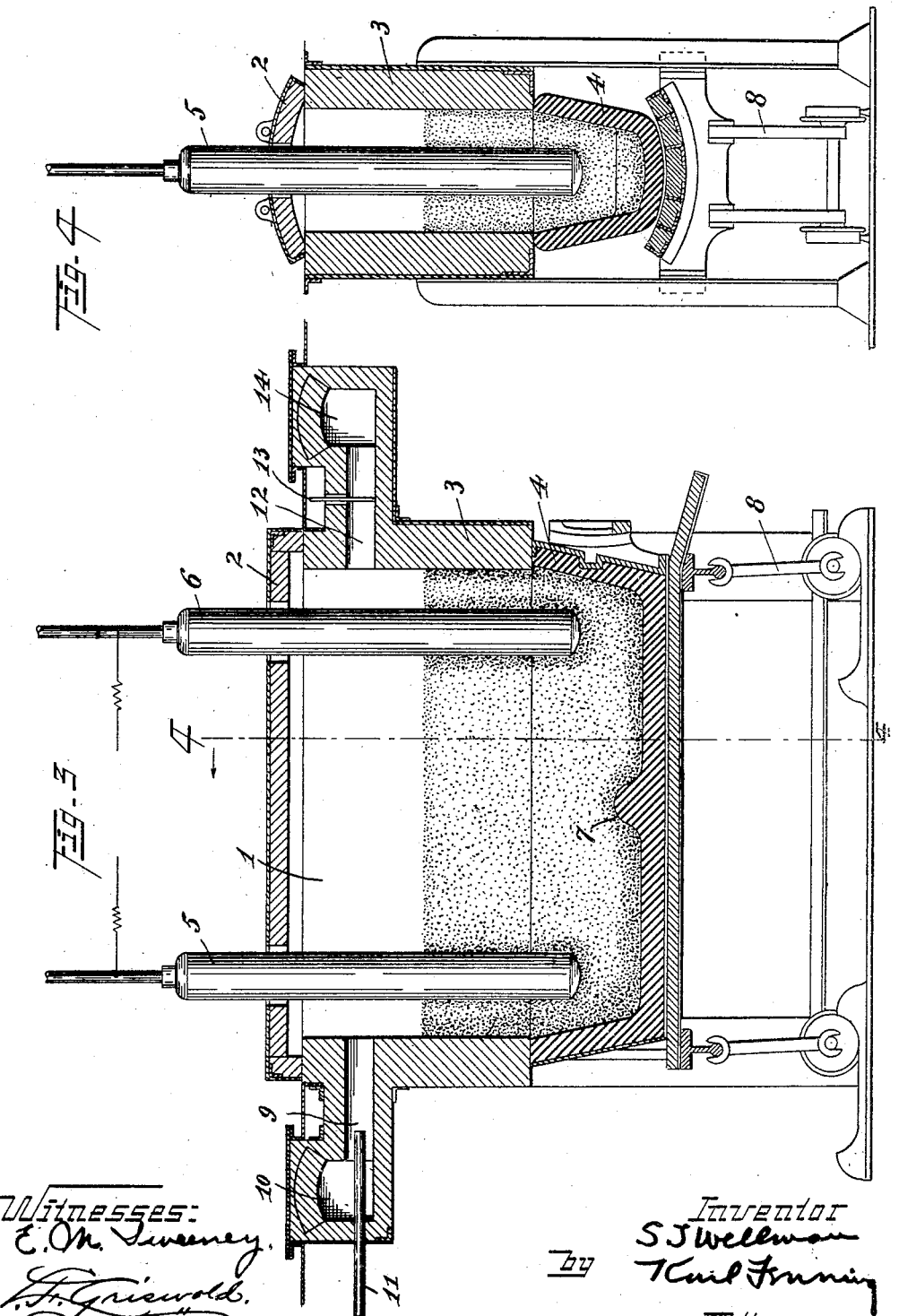

UNITED STATES PATENT OFFICE.

SAMUEL T. WELLMAN, OF CLEVELAND, OHIO.

APPARATUS FOR TREATING METALS.

1,116,772.  Specification of Letters Patent.  Patented Nov. 10, 1914.

Application filed August 18, 1911. Serial No. 644,831.

*To all whom it may concern:*

Be it known that I, SAMUEL T. WELLMAN, a citizen of the United States, residing in the city of Cleveland, State of Ohio, have invented certain new and useful Improvements in Apparatus for Treating Metals, of which the following is a specification.

In the production of pig iron by electricity, one form of furnace has had the reducing shaft over the crucible or melting chamber, the shape of the furnace being something like an ordinary blast furnace except that the crucible or melting chamber is flared out so that the electrodes can be inserted through the roof on an incline into the charge. The heat in the crucible is mostly produced by electricity, by the use of carbon or graphite electrodes. The heat is produced by the current from the electrodes passing through the carbon in the charge, enough charcoal or coke being charged to furnish gas for the reduction of the iron ore and also to saturate the iron with the carbon after it is reduced and melted.

The production of the necessary heat in the crucible by electricity, in this form of furnace, is only accomplished with great difficulty, being unsteady owing to the fact that cold material is constantly coming into the crucible from the shaft, this sometimes hangs up and comes down a large quantity at once. The electrodes must enter the furnace crucible at an angle and on this account the pressure of the ore, which enters from the top through the middle of the crucible, frequently breaks off the electrodes causing great delay and expense. The electrodes being embedded in the ore and carbon the part that is inside the furnace cannot be seen, and the manner in which the melting is going on cannot be determined except by the amount of electricity which is being taken. The condition of the bath cannot be determined and no tests can be taken to determine the quality of the metal bath. It is also difficult to determine the quantity of the melted metal which the crucible contains.

It is one object of my invention to overcome these objections at the same time retaining the many advantages of using electricity as a heating agent.

My improvement contemplates separating the operations of reducing and melting, making two steps, the first, or reducing of the ore being accomplished in a new and improved manner.

The furnace charge, which is made up in the same manner as where the combined reducing and melting furnace is used, being say three or four parts of iron ore and one part of charcoal or coke, with the addition of limestone or such other fluxes as may be necessary, is charged into a small furnace. This consists of a brick lined chamber. This chamber is open at both top and bottom, being closed by a cover on top when in operation. The bottom is also closed by a brick lined charging box. This charging box is supported in a cradle, suitable means being provided for raising and lowering the cradle. The reduction is accomplished with electricity, two electrodes passing down through the cover of the furnace, these being connected with the proper electric wires or cables, the current passing through them and from one to the other through the charge. The starting of the furnace may be aided by putting charcoal or coke in the bottom of the box, which is then fired and allowed to become incandescent. Then the balance of the charge is put in the furnace. Or the whole charge may be heated up to prepare it for the electricity by the waste gas from the other furnace in which ore is being reduced, as will be described later on. When the charge reaches the proper temperature the electricity is turned on and the reduction of the ore commences. The heating and reducing in this chamber can be carried to a point where the ore is simply reduced to a spongy iron or it can be reduced first to spongy iron and then to a metal bath containing more or less carbon.

The front or charging side of the melting furnace and reducers may be placed on the same line. An ordinary charging machine may run on rails in front of the furnace so that the charging box can be carried from the reducing to the melting furnace. Or in case of the melting furnace and reducing furnaces facing each other, they might be served by a charging machine which would be carried on an overhead traveling crane, the carrier of which would be turned 180 degrees in making the transfer.

When the reduction has gone as far as the operator wishes, the current is shut off and the cradle is lowered carrying with it the charging box, all of the charge having by this time settled down into the box out of the reducing chamber, due to the reduction of the iron ore and the consumption of the charcoal, the carbon of which combines with oxygen in the iron ore causing a large amount of gas. The charging box is then quickly transferred by the charging machine, in the usual manner, to the melting crucible or furnace. Being at a very high temperature this quickly melts. A number of these reducing furnaces would be provided for one melting furnace. The crucible or melting furnaces used need not necessarily be electrically heated, but a Siemens regenerative furnace heated by producer gas, or oil, or other similar devices may be used.

A flue may be provided at each end of each reducing furnace. Each set of flues of all the furnaces being connected together. When the reduction is going on, the waste gases which are rich in carbonic oxid gas pass out through one flue to the main gas flue, the opposite flue being closed. When the charge is being heated preparatory to receiving the electric current a blast pipe from a blower is pushed in through a flue and the gases from the reducers which are receiving the electric current pass through the main flue into the box and are burned with the air that enters through the blast pipe. The gases from the melting chamber might be so used. The damper having been opened the products of combustion pass out through the opposite flue, which leads to the chimney. By this means the waste gases are utilized, first to bring the charcoal to incandescence so that it will take the electric current, and second to heat up the ore and the remainder of the charge, this resulting in economy of power and saving of time.

Extending across the charging box and between the electrodes is a raised portion or bridge of the nonconducting lining for the purpose of cutting or separating any iron that may melt and run down into the bottom of the box into two portions and thus preventing it from acting as a path or conductor for the electric current, the effect of which would be that the bulk of the current would pass through this melted or heated iron without causing any reduction of the ore. The metallic iron being a better conductor the electric current would pass through it instead of through carbon of the charge as desired.

It is difficult, if not impossible, to bring every charge in all the reducing furnaces into exactly the same condition, but this is not necessary as they are added successively to the melted bath in the melting furnace. This bath can be tested by taking small test ingots out of it with a small ladle from time to time. When it is discovered that the metal in the bath is not what is desired it may be changed by proper treatment or addition. If pig iron is the product desired the bath may be kept covered most of the time with a layer of carbon with the object of saturating the iron with it and giving the iron a coarse open fracture with large crystals, this also saves the electrodes from being corroded by any unreduced ore which may be present. On the other hand if steel is the product desired as little carbon as possible is taken to the melting chamber or furnace and if carried over it naturally floats on top of the bath and can be easily skimmed off through the charging door.

In the old shaft furnace or combination of reducing furnace and melting furnace only pig iron or iron saturated with carbon can be made, as no opportunity is had to test the bath before tapping or to change its composition by any manipulations. But with my improved plan of separating the reducing and melting, an opportunity is had for testing and manipulating the charge in the melting chamber as is had in the ordinary open hearth steel process, and it is thus possible to make, as a finished product, the softest open grained pig iron, or high or low carbon steel, as may be desired. In making steel a smaller amount of carbon may be charged into and used in the reducing furnace than in making pig iron, only enough being used to reduce the ore, a minimum amount being carried over to the melting furnace.

In the accompanying drawings which show one concrete embodiment of my invention, Figure 1 is a general view of a plant for producing pig iron and steel in accordance with my invention. Fig. 2 shows in a diagrammatic way, the relative positions of the reducing chamber and of the melting chamber and crucible. Fig. 3 is a longitudinal vertical section of the reducing chamber. Fig. 4 is a transverse vertical section on a line 4—4 of Fig. 3.

The reducing chamber 1 consists of a removable cover 2 through which the charge is introduced, and under which is the stationary body portion 3 which opens below into the removable bottom closure 4 which is of the well known form generally called in the art a charging box and provided with a nonconducting refractory lining. The electrodes 5 and 6 pass through openings in the removable cover and extend through the body portion 3 and into the charging box 4 on opposite sides of a transverse ridge 7 of insulating material for preventing the flow of current through molten metal which may gather at the bottom of the vessel. The charging box 4 is supported in a cradle 8 by which it may be raised or lowered into and away from contact with the body portion of the reducing chamber. A flue 9 leads the gases produced in the charge into a tunnel 10 common to a plurality of reducing chambers. The blast pipe 11 extends into the flue 9 opening toward the reducing chamber so as to force air and gas into the reducing chamber and cause their combustion and initiate a reducing action. When this takes place the products of combustion are led out through a flue 12 provided with a valve 13 and opening into a tunnel 14 leading to a chimney 15.

The charging box 4 at the bottom of the reducing chamber is of a capacity to contain the entire charge when reduced and is adapted to be engaged by the charging machine 16 by which it may be transported to and emptied into the melting chamber or crucible 17 in which the treatment is completed either by the use of electricity through the electrodes 18 or by other well known means.

In Fig. 2 I have shown two banks of reducing chambers, the bank A being disposed opposite the crucible 17 so that the charging machine must have a revolving motion. The bank B on the other hand, being arranged in line with the crucible may be served by a charging machine which has merely longitudinal, lateral and vertical movements.

While I have described the particular arrangement shown in the drawings in some detail my invention is not confined to this specific arrangement, but may be availed of in essence in other ways.

I claim as my invention:

1. In metallurgical apparatus, a chamber for containing a charge of ore and flux, electrodes in the chamber for causing reduction of the ore, a removable closure at the bottom to the reducing chamber for holding the reduced charge, a chamber for continuing the treatment, means for removing the closure and charging its contents, while still hot, into the last mentioned chamber, and electric means for completing the treatment of the ore in the last named chamber.

2. In a reducing furnace, a top, a body portion, a base portion, an insulating ridge extending across the bottom of the base portion, electrodes extending through the body portion and on opposite sides of the ridge, and means for removing the base portion containing the reduced charge.

3. In metallurgical apparatus, a plurality of reducing chambers, each having a removable top, a stationary body portion a removable base portion adapted to contain the reduced material, and provided with a refractory insulating ridge extending across its bottom, and electrodes extending through the body portion on opposite sides of the ridge; a melting vessel, and a crane adapted to engage the respective removable base portions of the reducing chambers and introduce their contents into the melting vessel.

4. In metallurgical apparatus, a plurality of reducing chambers, a removable top for each, a stationary body portion for each, a removable base portion for each adapted to contain the reduced material, an insulating ridge extending across the bottom of each reducing chamber, and electrodes extending through the body portion of each on opposite sides of the ridge; a melting vessel, a crane adapted to engage the removable base portions of the reducing chambers and to introduce their contents into the melting vessel, and means for completing the treatment of the material in the melting vessel.

5. In a reducing furnace, a removable top, a stationary body portion, a removable base portion adapted to contain the reduced material and provided with an upwardly extending refractory insulating ridge, and electrodes extending through the body portion and on opposite sides of the ridge.

6. In metallurgical apparatus, a rectangular closed chamber for containing a charge, electrodes in the chamber for causing reduction of the ore, a removable closure at the bottom of the reducing chamber for holding the reduced charge, a chamber for continuing the treatment, means for removing the closure and charging its contents into the chamber for continuing the treatment, and means for completing the treatment of the ore in the last named chamber.

7. In a reducing furnace, a removable top, a stationary body portion, a removable base portion adapted to contain the reduced material, an upwardly extending insulating ridge extending across the bottom of the base portion, electrodes extending through the body portion and on opposite sides of the ridge, means for removing the base portion containing the reduced charge.

8. In a reducing furnace, a top, a body portion, and a charging box adapted to close the bottom of the furnace and to receive the reduced material.

9. In an electric reducing furnace, a charging box forming the bottom and receiving the reduced material.

10. In metallurgical apparatus, a chamber for containing a charge, electrodes in the chamber for causing reduction of the ore, a removable closure at the bottom to the reducing chamber for holding the reduced charge, a chamber for continuing the treatment, means for removing the closure and charging its contents while still hot into the chamber for continuing the treatment with other charges, means for completing the treatment of the ore in the last named chamber.

11. In metallurgical apparatus, a plurality of electric reducing chambers, oppositely disposed gas flues in each chamber, a valve in one flue and a blast pipe in the other flue, means for operating the valve, and means for introducing air under pressure through the blast pipe.

12. In metallurgical apparatus, a plurality of reducing chambers, in each chamber a flue acting alternately as inlet and outlet for gases, a blast pipe for introducing air when the flue acts as inlet and thereby producing combustion of the gases, another flue acting as outlet when the first mentioned flue acts as inlet, and a valve for closing the second flue when the first flue acts as outlet.

13. In metallurgical apparatus, a plurality of electric reducing chambers, oppositely disposed gas flues in each chamber, a valve in one flue and a blast pipe in the other flue, means for operating the valve, means for introducing air under pressure through the blast pipe, a tunnel connecting the flues having valves with each other and with a chimney, and a tunnel connecting the flues having blast pipes with each other.

14. In metallurgical apparatus, a plurality of reducing chambers each having electrodes and removable bottoms with insulating ridges between the electrodes, a vessel, means for introducing the contents of a plurality of reducing chambers into the vessel, and means for continuing the treatment of the mixture.

15. In a reducing furnace, a body portion, and a removable base portion provided with an upwardly extending ridge.

16. In a reducing furnace, a body portion, and a removable base portion adapted to contain reduced material and provided with a refractory insulating ridge.

17. In a reducing furnace, electrodes, a body portion, a removable base portion, and an insulating ridge in the base portion and between the electrodes.

Signed at Cleveland, this 16th day of August, 1911.

SAMUEL T. WELLMAN.

Witnesses:
KARL FENNING,
ELIZABETH M. SWEENEY.

---

Copies of this patent may be obtained for five cents each, by addressing the "Commissioner of Patents, Washington, D. C."